Oct. 11, 1966  R. P. WILTON ETAL  3,277,541
PHOTOGRAPHIC METHOD OF MAKING A PATTERN FOR MOLDING
Filed June 26, 1964

INVENTORS.
RALPH P. WILTON
JOHN J. FITZPATRICK
By
ATTORNEY

United States Patent Office 3,277,541
Patented Oct. 11, 1966

3,277,541
PHOTOGRAPHIC METHOD OF MAKING A
PATTERN FOR MOLDING
Ralph P. Wilton, S. 4th St., Wrightsville, Pa., and John J.
Fitzpatrick, P.O. Box 1, Hellam, Pa.
Filed June 26, 1964, Ser. No. 378,323
5 Claims. (Cl. 22—195)

This invention relates to a method of making patterns for molds and, more particularly, to a method of making patterns having embossed designs thereon, said method resulting in a much less expensive way of forming patterns than has been possible heretofore.

There is considerable demand for many types of articles upon which embossed designs are formed, most of these products being produced by being cast or pressed in suitable molds. Production of molds to form such articles, however, is quite expensive because it is not uncommon for molds used for such purposes to cost several thousand dollars or more, depending upon the details and intricacies of the designs desired upon the articles.

By way of illustration, and not limitation, to indicate at least some of the very popular types of products upon which various emblems, designs, insignias, and indicias of many types are desired, reference is made to such items as ashtrays, holloware of various kinds including cups, mugs, bowls and plates of many types, which are molded or cast from plastics, ceramics, glass and metals of various kinds. Metallic emblems or seals frequently embody figures and designs of the type generally referred to above. These are in popular demand when mounted upon wooden plaques and the like.

Various schools, colleges, fraternal organizations, and the like, frequently desire to have a certain product or group of products manufactured with their emblem or insignia formed therein, somewhat in the nature of a seal. When items of this type are manufactured in limited numbers, such as for a local fraternity chapter or a school class of relatively small numbers, the cost of preparing the model or pattern from which a mold is made, or the cost of making the mold per se if no pattern is made, is so great that the individual cost of the molded articles made from said mold is prohibitive, due to the fact that molds of the type required, or of patterns to form such molds, are made by die makers who are highly skilled and many hours of their time, at relatively high rates, are required to make such dies. Accordingly, articles of this type frequently are restricted to being manufactured in very substantial quantities in order to amortize the cost of the pattern, dies, or molds, over the entire production in order to be able to sell the individual items at a reasonable price.

It is the principal object of the present invention to provide a relatively inexpensive method of forming patterns which preferably have thereon embossed designs of various kinds for purposes of making complementary dies or molds therefrom in which even a very limited number of molded or die-cast articles may be produced at reasonable cost because of the very simple procedure utilized in making such patterns and the corresponding dies or molds.

It is another object of the invention, ancillary to the foregoing object, to employ simple line drawings and several photographic procedures so utilized that an embossed design, insignia, emblem, or the like, of desired thickness, may be formed without requiring skilled mechanics, such as die makers, and can be applied to the principal or primary patterns employed in making the article upon which it is desired to have such embossed design formed.

Details of the foregoing objects and of the invention, as well as other objects thereof, are set forth in the following specification and illustrated in the accompanying drawing comprising a part thereof.

The present invention particularly is concerned with the making of embossed designs comprising insignia, emblems, indicia of various kinds, as well as many types of ornamental arrangements, some of which may embody lettering and numerals of various kinds comprising names, slogans, quotations and the like, without restriction thereto, as well as ornamental artwork. The primary object of the invention is to provide such designs in the form of embossments, quickly and inexpensively, for attachment to the principal or primary patterns for making a wide range of products from many types of different materials including plastics of various kinds, ceramic, glass, metal, and the like, by a molding process employing molds made from such patterns.

As indicated hereinabove, the most conventional method of making molds to produce articles having ornamentation thereon, including emblems, designs, insignias, lettering or numerals of different kinds comprising slogans, and the like, is to employ the skills of highly paid craftsmen, such as die makers, who either carve or engrave such insignia and the like, in positive fashion, upon the model or pattern from which the mold is made, or such insignia, ornamentation and the like is carved or otherwise fashioned by such craftsmen, in negative manner, into the wall surfaces of the molds per se. Either operation is tedious, time-consuming, and expensive, whereby the manufacturing of cast or molded products, such as ashtrays, drinking mugs, cups of all kinds, flatware, such as_ plates and the like, plaques, etc., when formed by molding from molds made in such manner, necessarily requires large production runs of thousands of pieces, if the selling price is to be maintained in a reasonable range.

By way of specific illustration, if a fraternity chapter of a certain college campus desires to order 50 pewter drinking mugs having their fraternity emblem embossed on the side thereof, the production cost for making a pattern and corresponding mold to produce such a relatively small order would be so high that the individual cost of such mugs would be exorbitant, as compared with the individual cost thereof if a production run comprising thousands of such mugs was to be made. There is a great deal of business to be obtained, however, in relatively small orders of cast and molded objects of all kinds, if a relatively inexpensive procedure was available for making either the patterns or molds for such articles having indicia, symbols, ornamental arrangements and the like thereon. The present invention provides what heretofore has been lacking for purposes of making such patterns and molds by inexpensive means, whereby it now is profitable to produce orders of relatively limited quantities of such articles, at reasonable cost, and yet provide a satisfactory profit to the manufacturer.

Figure 1:
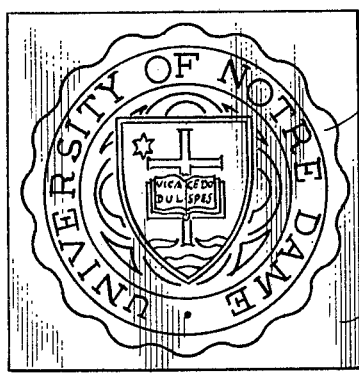
FIG. 1 is an examplary illustration of a selected emblem formed by conventional printing technique and of which a pattern is desired comprising an embossment to be affixed to the principal pattern of the object upon which the insignia is to be formed by casting or molding incident to forming the article.

The process comprising the present invention comprises selecting and obtaining a prepared copy of the design, insignia, or the like, which it is desired to provide, preferably in embossed manner, upon the surface of a certain article of commerce, such as an ashtray, bowl, mug, or the like, for example. Such designs are readily available in commerce. By way of specific example, Student Centers in all colleges and universities usually have available for sale many types and sizes of the university seal or emblem for application to windshields of cars, luggage, and the like. These are available in various sizes and colors. Frequently they are in the nature of a decalcomania. One such example of printed seal 10 is shown in FIG. 1, printed on a backing sheet 12, usually of paper nature. By very simply making a line drawing reproduction 14 of the seal 10, for example, onto a sheet of paper 16, part of which can be quickly reproduced through the use of instruments such as a compass, French curves, etc., the first step of the process comprising part of the present invention is achieved. For convenience, the line drawing 14 may be substantially of the same scale as the seal 10, or, for convenience, if desired, a larger scale may be selected if portions of the design or emblem which are to be reproduced are of an intricate nature.

Figure 2:
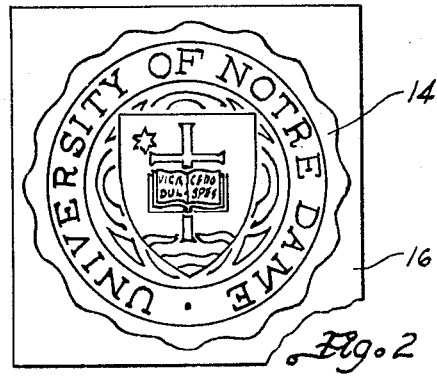
FIG. 2 is a simple line drawing of the design or insignia, made quickly and simply from the design such as illustrated in FIG. 1.
Figure 3:
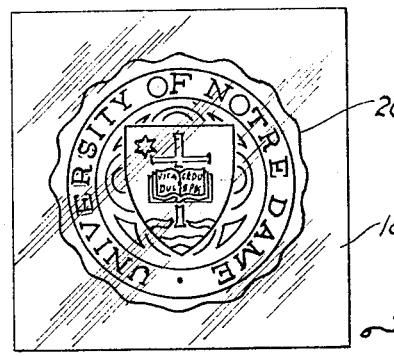
FIG. 3 is a positive copy of the line drawing shown in FIG. 2 and produced by photographic means to comprise an opaque background, such as a photographic negative, but the design is positive and transparent thereon in contrast to the normal designs on conventional photographic negatives.

The next step comprises the production of a photographic negative 18, shown in FIG. 3, upon which the line drawing 14 shown in FIG. 2 is reproduced in a positive manner in the form of a transparent design 20. It will be understood that the photographic negative 18 will be opaque in all background areas; only the lines comprising the design of the line drawing 14 being transparent and such design is positive. For purposes of simplifying the illustration in FIG. 3, however, the background areas of the photographic negative 18 have been shaded to represent a photographic negative, but it is to be understood that these areas are solidly opaque.

One of the advantages of reproducing a transparent design of this type, by photographic means, is that, regardless of the size of the line drawing 14, at least within reasonable limits, the photographic reproduction 18 can be made at any different desired scale or size, larger or smaller than the drawing 14. A further advantage of using photographic reproduction means to form the negative 18 with the positive, transparent design 20 thereon is that, especially if the design is intricate and initially made as a line drawing 14, of FIG. 2, on a relatively large scale, the same can be reproduced, very faithfully and accurately, into a much smaller scale reproduction comprising the transparent design 20. Such photographic reproduction also aids in broadening the individual lines of the design 20 as compared with the lines of the line drawing 14 of FIG. 2 because of the well-known photographic principle that each time another copy is made, a certain amount of sharpness is lost, but, in the present process, this comprises an advantage due to the broadening of the lines of the transparent design 20, for purposes to be described.

In producing the photographic negative 18, the size is selected preferably to be identical with that of the design it is desired to produce upon the pattern from which molds are to be made to produce the articles which are to have the desired seal or insignia formed thereon. Accordingly, the next step in the process of the present invention is to select a sheet of metal, such as type metal, zinc, or copper, for example, with which etching fluid will react, and substantially of a thickness equal to the height desired for the embossed seal to extend above the surface of the body of the article upon which the seal is to be molded, whereby the finished product will show the seal in superimposed manner and thus prominently display the same.

A photo-sensitive coating is applied to one surface of the sheet of metal and, through a photographic contact process, for example, the negative 18 is placed in contact with the photo-sensitive surface and then is exposed to light to convert those portions of the photo-sensitive coating on the sheet of metal which are immediately beneath the transparent design 20 to a chemical form that is resistant to action by etching solution, such as normal acids employed in photo-engraving processes, whereas those areas of the sensitized surface which are beneath the opaque areas of the photographic negative 18 will be subject to etching by such solutions.

After the sensitized coating of the sheet of metal has been exposed to light through the negative 18 for a required period of time, the light is extinguished, the negative is removed from the sheet of metal, and said sheet with the photographically-exposed sensitized surface thereon then is subjected to etching solution, such as used in photo-engraving processes, as indicated above, to remove the background areas of the metal immediately surrounding the lines comprising the design, whereby all the background areas of the metallic sheet 24 uniformly are reduced in height by reaction of the etching solution thereon, leaving the design lines 22 at the same uniform height as the surface of the metal sheet to which the photo-sensitive coating was applied.

The foregoing procedure results in the production of an embossed design comprising the lines 22, the height of the embossing thereof being controlled by the length of time to which the metal sheet is subjected to action by the etching solution. If relatively deep relief is desired in the design, the solution is permitted to react with the metal sheet for a longer period of time than if a shallower type of relief is desired.

Figure 4:
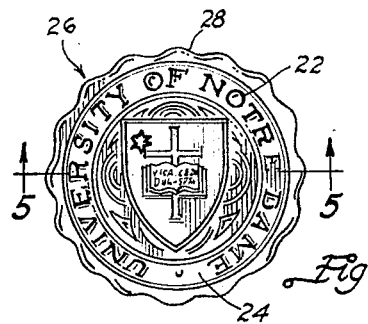
FIG. 4 is a metallic pattern formed by photo-engraving upon a sensitized coating applied to a sheet of metal of desired thickness through the use of the photographic negative of the positive design shown in FIG. 3.
Figure 3A:
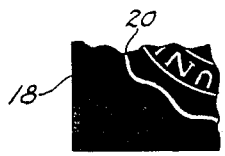
FIG. 3a is a fragmentary detail of the negative of FIG. 3.

After the etching of the metallic sheet 24 has been completed, the desired configuration of the design pattern 26 readily is cut from the sheet of metal, the perimeter 28 of the pattern 26 perferably being of an ornamental nature and, in the specific illustration shown in FIG. 4, resembles the normal scalloped edge of a seal. Such perimeter, however, will vary in accordance with the finished design desired in such pattern, whereby the present illustration is not to be regarded as restrictive.

Figures 5, 5A:
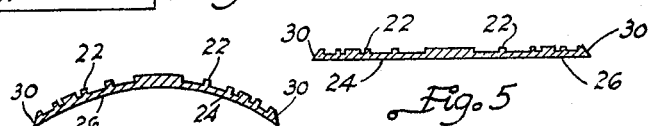
FIG. 5 is a cross-section of the emblem pattern shown in FIG. 4, as seen on the line 5—5 of FIG. 4.
FIG. 5a is a view similar to FIG. 5, but showing an exemplary curved configuration of the emblem pattern of FIG. 5 for purposes of applying the pattern to a curved surface of the principal pattern from which the article is to be formed which will have such emblem directly molded upon the surface thereof.

Referring to FIG. 5, the design pattern 26 of FIG. 4 is shown in vertical sectional view in order to provide an exemplary illustration of the embossed design lines 22 of such pattern with respect to the remaining background metal which has previously been subjected to etching. The pattern 26 is relatively flat, but it will be seen that the edges 30 of the pattern preferably are beveled in order that the perimetrical edges of the pattern 26 will blend into the surfaces of the main pattern 32, shown in FIG. 6, when affixed thereto.

Figure 6:
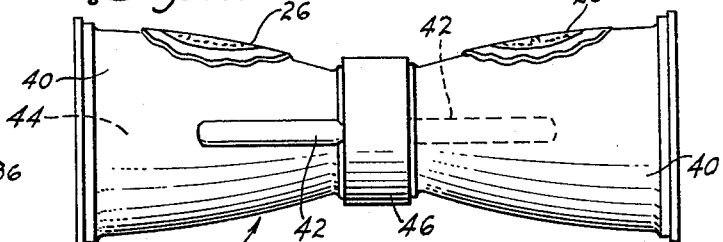
FIG. 6 is a side elevation of an exemplary pattern of a type shaped to form a pair of mugs each having affixed to the outer surfaces thereof one of the embossments of the type shown in FIGS. 4 and 5, said pattern being of the type requiring the use of a core.
Figure 7:
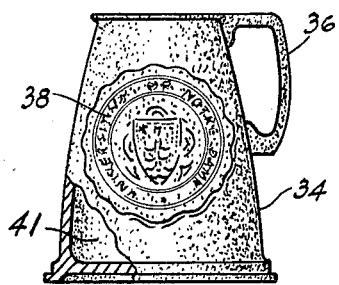
FIG. 7 is an exemplary side view of one of the mugs formed by a mold made by the use of the pattern shown in FIG. 6, part of the mug being broken away to show details of the interior construction thereof.

To illustrate a specific example of a pattern of a product article readily adapted to being formed by casting or molding through the formation of a pattern to make a suitable mold from that pattern, attention is directed to FIGS. 6 and 7. In FIG. 7, an exemplary mug 34 is shown having a handle 36. The desired emblem or medallion 38 is formed thereon, in embossed fashion, in accordance with the process of the present invention, and comprising a product produced in accordance with said process. As will be seen by the broken-away portion of FIG. 7, the mug has a hollow interior 41, which is produced through the use of a core in the molding machine, of the type shown in FIG. 8.

A suitable pattern to form the exemplary mug 34 of FIG. 7 is shown in FIG. 6, wherein it is contemplated that a pair of mugs may be molded simultaneously by forming the opposite ends 40 of the main pattern 32 so as individually to comprise patterns of the mug 34., including the handle portions 42. In forming a mold from the pattern 32, it is contemplated that the mold will separate upon the exemplary parting line 44.

In order to provide a hollow interior for each of the mugs 34 which will be produced from a mold made by the pattern 32, an appropriate core, such as commonly employed in metal casting, for example, is formed so as to be complementary to the hollow interior 41 of the mugs and the portions of the core which form said hollow interior are connected by an intermediate portion 46' which is received within and is both positioned and supported by that portion of the mold cavity formed by the central portion 46 of the compound type pattern 32, as is clearly shown in FIG. 6.

Figure 8:
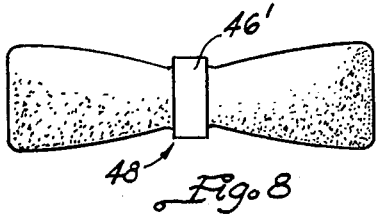
FIG. 8 is an exemplary side view of a core of the type required to form the mug shown in FIG. 7.

A simple, exemplary core 48, shown on a larger scale than employed in FIG. 6, and of the type contemplated for use in the mold cavities formed by the pattern 32, is shown in FIG. 8. Particularly if the exemplary mugs 34 are to be formed from cast metal, such as pewter, or the like, the heat from the molten metal will burn the cores 48 sufficiently that, when the molding of the mugs is completed, the cores readily are removed from the interiors thereof in accordance with well-known foundry procedures.

Inasmuch as the exterior surfaces of the opposite end portions 40 of the pattern 32 are circular in cross-section, when the design pattern 26, formed in the manner and by the method described hereinabove, is to be affixed to the exterior surfaces of the main pattern 32, the pattern 26 will have to be curved so as to be complementary to such exterior surface of the main pattern that is to receive the design pattern and an exemplary curved configuration thereof is illustrated in FIG. 5a. From this figure, it will be seen that the edges 30 of the pattern 26, which are beveled appropriately, will provide adequate draft for the design pattern when the same is removed from the mold cavity formed by said pattern, incident to the principal pattern 32 being removed from such mold cavity.

In addition to the beveled edges 30 of the design pattern 26 being beveled so as to provide a draft on the pattern, such beveling, and other desired shaping of the perimetrical edges of the design pattern as may be desired, are performed especially to blend the design pattern 26 into the adjacent surfaces of the main pattern 32. For this purpose, any suitable type of filling material may be used, especially to form what technically comprises a fillet around such perimetrical edges of the design pattern so as to contribute to the esthetic results of the molded product and particularly in the emblem or medallion 38 formed thereon, as illustrated in FIG. 7.

Any appropriate means found convenient may be employed for securing the design patterns 26 either to the exterior surfaces of the main pattern 32 or recessed to any desired degree into such surfaces. For example, if a green-sand mold is to be formed by use of the pattern 32 in connection with producing cast metallic products such as the exemplary mug 34, the pattern 32 very conveniently and inexpensively may be formed from wood. Under such circumstances, the design patterns 26 may be affixed thereto by appropriate cement, either with or without the employment of brads, for example, the heads of which may be countersunk into the surface of the design patterns so as to be inconspicuous. However, under circumstances where, for example, the pattern 32 may be formed from metal, the design patterns 26 may be attached thereto by soldering or the like and such means likewise readily affords a suitable blending of the perimetrical edges of the patterns 26 with the surfaces of the main pattern 32.

The present invention is especially suited to the formation of patterns from which molds may be made for use in casting various types of metallic articles of both holloware and flatware, for example. The mug 34 is to be regarded as only a single, nonrestrictive example thereof. Though a number of different types of metal are suitable for forming commercial articles of this type, pewter is especially well-suited to such casting procedure in that relatively limited finishing operations are required after the same have been cast. The specific mentioning of pewter, however, is, likewise, not to be regarded as restrictive.

The formulation of patterns having various types of design patterns made in accordance with the present invention affixed thereto may be formed from various types of material, depending upon the kind and type of mold to be made from such patterns, especially in connection with the formation of commercial articles other than those cast from metal, such as by being molded from suitable synthetic resin material, commonly referred to as plastic material, as well as molded ceramic articles of so-called green-ware of a ceramic nature to which glaze subsequently is applied, and also molded glass articles. Accordingly, it will be seen that the present invention, including both the method as well as the product aspects thereof, is subject to relatively wide application in the production of various types of articles having emblems, designs, and the like, affixed thereto.

While the invention has been described and illustrated in its several preferred embodiments, it should be understood that the invention is not to be limited to the precise details herein illustrated and described since the same may be carried out in other ways falling within the scope of the invention as claimed.

We claim:

1. A method of forming a pattern of an article having a positive embossed design thereon and from which a mold having a negative impression of said pattern may be formed, said method comprising the steps of preparing a positive line drawing of said design which is to be embossed upon said pattern, photographing said line drawing and forming a print thereof having an opaque background and a transparent positive image of said design, photographing said print upon a metallic sheet having a photo-sensitive coating to transfer the positive design to said coating, chemically etching the background areas between the lines of said design to a desired substantially uniform depth into said metal sheet, said depth being substantial and sufficient to provide a positive embossment of said design of adequate height above the background thereof to serve as a pattern embossment which when transferred to molding material will produce a mold cavity of sufficient depth to form said embossed design upon an article molded from metal poured into said mold cavity, and affixing said embossment to the surface of the body of a pattern of an article to be molded with said design embossed thereon to complete the formation of said pattern.

2. A method of forming a positive pattern according to claim 1 in which said photographic print of said drawing is at a scale equal to that desired for said embossing to be formed as a pattern, the same having an opaque background upon which a transparent positive image of the design is imposed.

3. The method of forming a pattern having a positive embossed design thereon according to claim 1 including the further step of cutting said etched embossed design from said sheet of metal to form a desired perimeter around said design prior to affixing the same to the body of said pattern.

4. The method according to claim 3 in which said cut-out embossed design is suitably shaped to conform the same to the body surface of said pattern to which it is affixed.

5. The method according to claim 3 in which said cut-out embossed design and the perimetrical edges thereof are conformed to the surface of the body of the pattern to which it is affixed to blend into said surface by tapering said edges and thereby blending said design onto said surface, thereby also providing draft on said pattern for ready removal from a mold formed therefrom.

References Cited by the Examiner

UNITED STATES PATENTS

| | | | |
|---|---|---|---|
| 36,821 | 10/1862 | Poitevin | 264—227 |
| 1,143,991 | 6/1915 | Ormay | 96—36 |
| 1,792,486 | 2/1931 | Feinberg | 264—227 X |
| 1,806,451 | 5/1931 | Flack | 22—190 |
| 2,003,864 | 6/1935 | Nock | 22—190 |
| 2,474,428 | 6/1949 | Kindt | 22—158 |
| 2,743,629 | 5/1956 | Pellegrino et al. | 22—195 X |

J. SPENCER OVERHOLSER, *Primary Examiner.*

E. MAR, *Assistant Examiner.*